Oct. 20, 1970   B. C. MOSES ETAL   3,535,414
PROCESS FOR STAMPING SOAP TABLETS AND THE LIKE
Original Filed Oct. 4, 1966   4 Sheets-Sheet 2
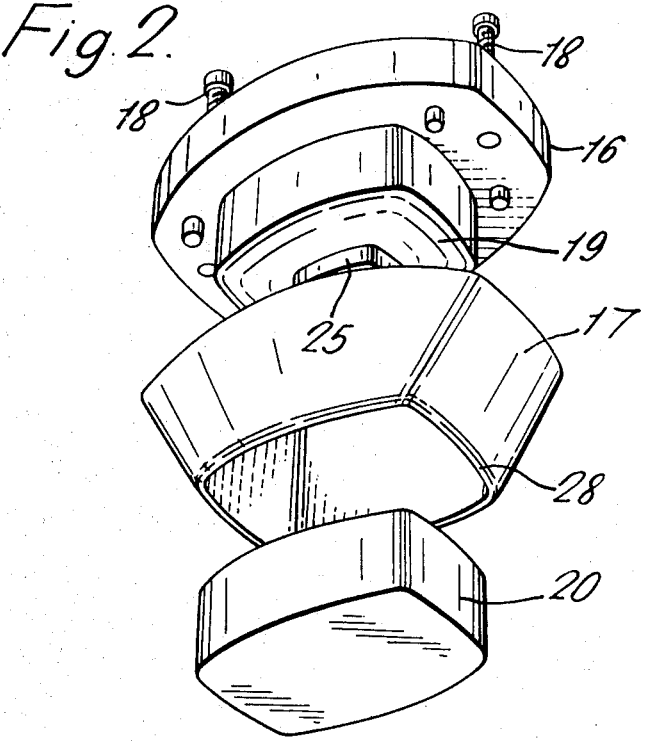
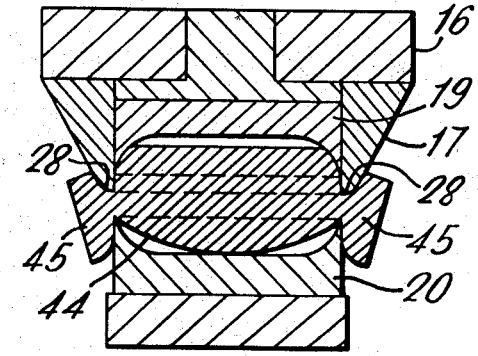
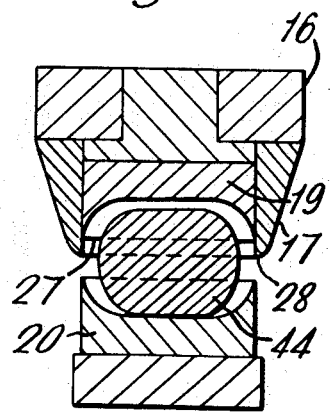
INVENTORS.
BERNARD CECIL MOSES &
DAVID HENRY THOMAS
BY
their ATTORNEYS.

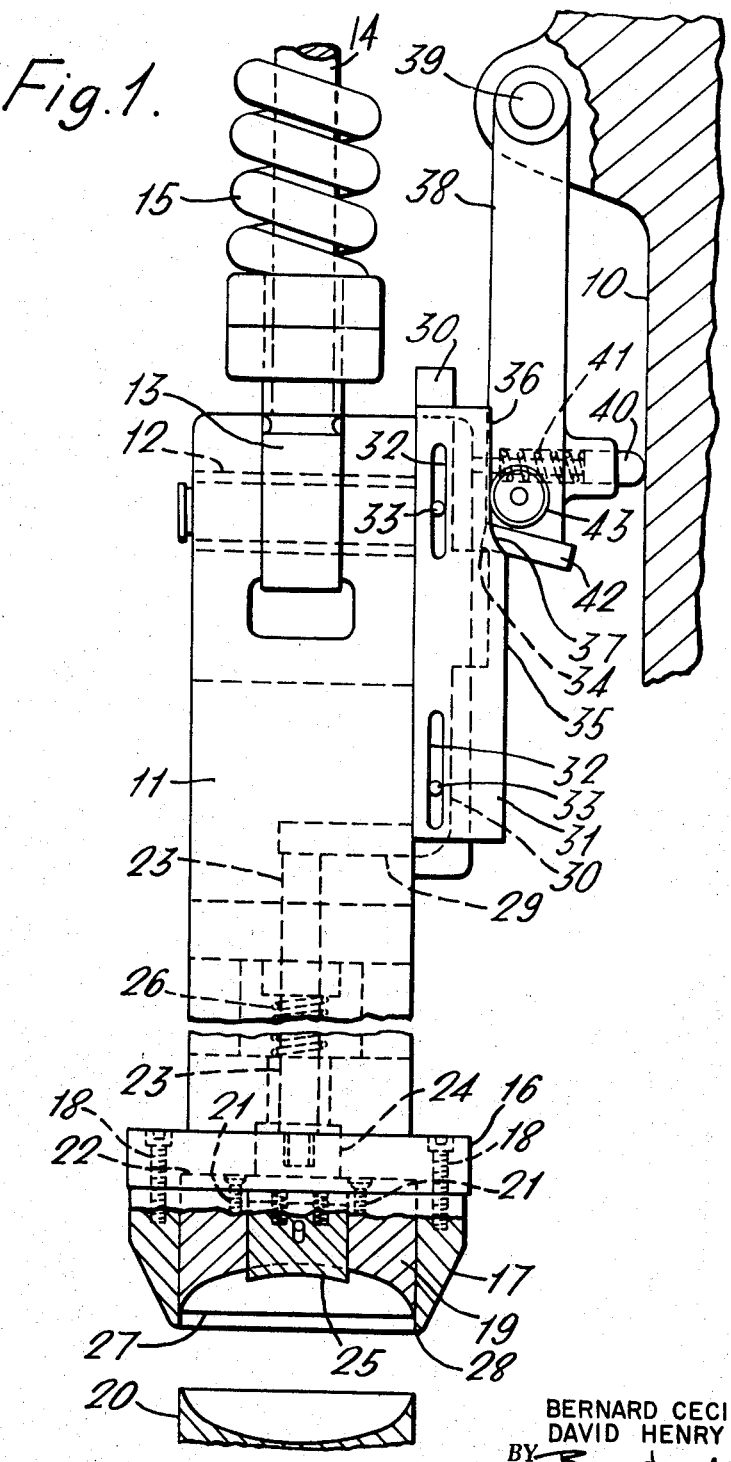

INVENTORS.
BERNARD CECIL MOSES &
DAVID HENRY THOMAS their ATTORNEYS.

INVENTORS.
BERNARD CECIL MOSES &
DAVID HENRY THOMAS their ATTORNEYS

United States Patent Office
3,535,414
Patented Oct. 20, 1970

3,535,414
PROCESS FOR STAMPING SOAP TABLETS
AND THE LIKE
Bernard Cecil Moses, West Kirby, and David Henry
Thomas, Bebington, England, assignors to Lever
Brothers Company, New York, N.Y., a corporation of
Maine
Original application Oct. 4, 1966, Ser. No. 584,120, now
Patent No. 3,449,804, dated June 17, 1969. Divided
and this application Aug. 9, 1968, Ser. No. 797,288
Claims priority, application Great Britain, Oct. 7, 1965,
42,649/65
Int. Cl. B29c 17/12
U.S. Cl. 264—161
2 Claims

ABSTRACT OF THE DISCLOSURE

A process for stamping capacity soap tablets without extrusion of material from between a pair of dies which close lip-to-lip, in which a billet of soap which is oversized only in the longitudinal direction is positioned between mating die halves to overhang at both ends of the die halves, the ends of the billet are trimmed to correspond in contour with the contours of the end of said die halves, and the trimmed billet is deformed and shaped to form a capacity tablet with substantially no extrusion of material from between the die halves.

---

This is a division of application Ser. No. 584,120, filed Oct. 4, 1966, now Pat. No. 3,449,804.

This invention relates to an improved die stamping process for soap tablets and the like, and also to a die set for carrying out the improved process.

In the forming of soap tablets to so-called "capacity" shapes, the respective dies of a die pair of a stamping press are arranged to come almost completely together, with minimum separating, so that the final shape of the soap tablet produced corresponds substantially to the internal volume or capacity of the closed die pair. This contrasts with a soap tablet produced by a die pair in which upper and lower dies do not closely approach each other, but are still considerably spaced aprt when the press completes its operative stroke. The space between the spaced die pair is usually bounded by a box, surrounding the lower die and defining a lateral mould surface for the stamped tablet, which thus has die-shaped top and bottom faces and a continuous flat peripheral band encompassing its sides and ends.

Usually the process of stamping capacity tablets is one in which surplus material is extruded from between the dies as scrap, and the removal and disposal of this extruded scrap presents serious problems of cleaning and collection.

Since billets cut from a bar extruded from a soap plodder have a crystalline grain structure in the longitudinal extrusion direction of the bar, lateral extrusion of soap from a blank or billet squeezed between a die pair to form a capacity tablet produces undesirable horizontal stratification of this grain structure of the billet in the region of the horizontal medial plane of the stamped tablet.

This could lead to the phenomenon known as "oyster shell cracking" of the stamped tablets, which is a tendency to flaking in the region of the horizontal medial plane.

According to the present invention a process of diestamping a billet of soap or the like having a longitudinal crystalline grain structure comprises the steps of placing a billet which is oversize only in its longitudinal direction between mating die halves to overhang at both ends of said mating die halves, trimming the ends of said billet to correspond in contour with the contours of the ends of said die halves and deforming and shaping the trimmed billet by means of the die halves to form a capacity tablet, with substantially no extrusion of soap or the like from between the die halves.

Also according to the invention, one of the mating die halves is operatively associated with a shell member having billet-trimming end portions which project in advance of said die half towards the other die half, and which have cutting edges of contour corresponding to the end contours of said die halves.

Further according to the present invention, in the process of die-stamping a billet of soap or the like having a longitudinal crystalline grain structure, a billet which is oversize only in the longitudinal direction is placed between, and to overhang at both ends of, upper and lower mating die halves, the upper one of which is recessed within a close-fitting tubular shell which wholly surrounds it and receives the lower die half as a sliding fit, the ends of the billet are trimmed off by interaction of the rim of the shell and the lower die half, as the dies are moved towards each other, to remove oversize material from the billet ends and to pre-shape such ends to correspond to the contours of the ends of the die halves, and the remainder of the billet is deformed and shaped by means of the die halves to form a capacity tablet with substantially no extrusion of soap or the like from between the die halves.

Also according to the invention, a die set for stamping a billet of soap or the like to form a capacity tablet comprises upper and lower die halves each having a cavity bounded by a continuous lip, which lips are adapted substantially to contact one another in use, and a shell member operatively associated with the upper die half and having at least respective trimming portions at opposite ends which bound the ends of the lip of the upper die half and project in advance of the upper die half towards the lower die half to terminate as cutting edges of contour corresponding to the contours of the ends of said die halves.

Also according to the invention, a die set for stamping a billet of soap or the like to form a capacity tablet comprises upper and lower die halves each having a cavity bounded by a continuous lip, which lips are adapted substantially to contact one another in use, and a tubular shell member within which the upper die half is recessed so that its lip is completely bounded by the inner wall of the shell member, the latter being adapted to receive the lower die half as a sliding fit so that the inner wall of the shell member also bounds the lip of the lower die part when the lips approach each other.

The shell member preferably is not movable relative to the upper die half recessed within it, although the shell member and die half may be relatively adjustable for setting the distance by which the upper die half is recessed within the shell, and the upper die half is provided with an ejector the projection of which from the die face is equal to or greater than the distance by which the upper die half is recessed within the shell.

Alternatively the shell member and the upper die half may be relatively slidable, so that the shell member is relatively retractable for bringing its rim behind the lip of the upper die half during release of a stamped tablet from the dies.

Preferably the upper die half is recessed within the shell for a distance such that the lip of the die half is from 0.1875 inch (4.755 mm.) to 0.625 inch (15.875 mm.) from the rim of the shell.

The inner surface of the shell may taper outwardly uniformly towards the shell rim from the lip of the die half which is recessed within the shell, the taper being such that when the dies are closed together the maximum clearance between the rim of the shell and the sides of the lower die is 0.005 inch (0.127 mm.). This tapering of the inner face of the shell facilitates the escape of any entrapped air as the dies are closing.

Embodiments of the invention will now be described with reference to the accompanying drawings, in which:

FIG. 1 is a fragmentary side elevation of a soap stamper, showing the die slide which incorporates a die set constructed according to the invention.

FIG. 2 is an "exploded" perspective view, to an enlarged scale, of the die set shown in FIG. 1.

FIG. 3 is a diagram, in central longitudinal cross-section, showing the die set in one position in the operating cycle of stamping a capacity soap tablet.

FIG. 4 is a side elevation of FIG. 3 in central transverse cross-section.

Figure 5:
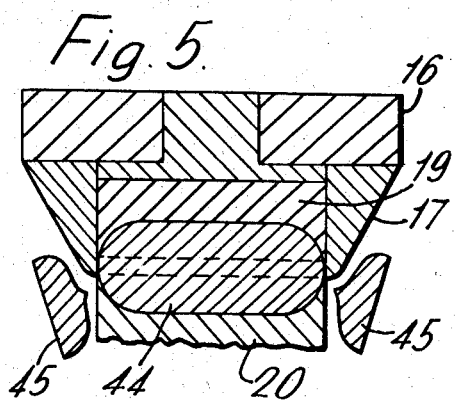
FIG. 5 is a similar diagram to FIG. 3, but shows the die set in a subsequent position in the operating cycle.

Referring to FIGS. 1 and 2, the frame of a vertical stamper is indicated at 10, and the vertically reciprocable die slide 11 is pivotally connected, in generally well-known manner, to a wrist pin 12 encircled by the eye 13 of a guide rod 14 for a thrust spring 15.

The remainder of the frame of the vertical stamper and the mechanism for operating the die slide are not shown, since they are details well-known in the art of soap stamping machines and form no part of the present invention.

Rigidly secured to the bottom end of the die slide 11 is a transverse mounting plate 16, and a tubular shell member 17 is removably secured to the underside of the plate 16 by screws 18. Slidably recessed within the shell member 17 as a close sliding fit is an upper die half 19, the shell member 17 being relatively-retractable as regards the upper die half 19 as will be explained below. Opposing the upper die half 19 is a lower die half 20, and the shell member 17 can receive the lower die half 20 as a close sliding fit. The die slide 11 is shown in its lowest operative position in FIG. 1, in which position the die halves 19 and 20 would be closed together. However, they are shown apart in FIG. 1 for the sake of clarity.

Referring only to FIG. 1 of the drawings, the upper die half 19 is secured by screws 21 to a mounting plate 22 carried by a boss 24 at the bottom end of a rod 23 which extends upwardly within the die slide 11 and is slidable therein, the boss 24 passing through an aperture in the mounting plate 16 for the shell member 17.

The upper die half 19 is shown as provided with a conventional spring-loaded central ejector 25 (also shown in FIG. 2).

The rod 23 is spring-loaded upwardly by a spring 26, so that normally the upper die half 19 is urged into the position shown in FIG. 1 where it is recessed within the relatively-retractable shell member 17, with the lip 27 of the upper die half 19 spaced inwardly from the rim 28 of the tubular shell member 17 a distance of not less than 0.1875 inch (4.755 mm.) and not exceeding 0.625 inch (15.875 mm.), 0.1875 inch being the preferred distance. From the lip 27 of the die half 19 to the rim 28 of the shell member 17, the inner surface of the shell member 17 is uniformly tapered outwardly, this taper being such that when the die halves 19 and 20 are closed together the maximum clearance between the rim 28 of the shell 17 and the sides of the lower die 20 is 0.005 inch (0.127 mm.), the preferred clearance being 0.005 inch and this taper being provided to facilitate the escape of entrapped air as the dies are closing. Projecting from the upper end of the rod 23 is a lateral arm 29 which extends to one side of the die slide 11 and carries an upper extension 30 which lies alongside the body of the die slide 11.

A cam plate 31 is secured to the same side of the die slide 11, and two vertical elongated slots 32 in the cam plate 13 receive and slidably guide respective cross-pins 33 carried by the extension 30, the extension 30 being formed with an integral abutment shoulder 34, and the cam plate 31 having a lateral cam profile comprising a high portion 35 and a low portion 36 connected by a ramp 37.

A depending lever arm 38 is pivoted to the machine frame 10 at 39. Near the lower end of the lever arm 38, a plunger 40 is spring-loaded to project laterally therefrom and engage the machine frame 10, the spring 41 which is loading the plunger 40 therefore being operative to urge the lower end of the lever arm 38 towards the die slide 11. The tip of the lever arm 38 carries a detent block 42, which in the lowest operative position of the die slide shown in FIG. 1 has its nose engaging above the abutment shoulder 34 of the upper extension 30 of the lateral arm 29 of the rod 23 secured to the upper die half 19. At the same time a cam roller 43 carried by the lever arm 38 is engaged with the low portion 36 of the lateral cam profile of the cam plate 31.

When the die slide 11 begins to move upwardly, carrying the shell member 17 therewith, the upper die half 19 remains stationary because of the engagement of the nose of the detent block 42 above the abutment shoulder 34 of the upper extension 30. The shell member 17 is therefore retracted upwardly relative to the upper die half 19, compressing the spring 26, to an extent which brings the rim of the shell member 17 above the lip 27 of the upper die half 19. Since the cam plate moves upwardly with the die slide 11, the cam roller 43 on the lever arm 38 is engaged by the ramp 37 and the lever arm is pivoted away from the die slide 11 until the cam roller 43 engages with the high portion 35 of the lateral cam profile of the cam plate 31.

When the lever arm 38 is pivoted away from the die slide 11, the nose of the detent block 42 is disengaged from above the abutment shoulder 34 of the upper extension 30, so that the latter, the lateral arm 29, the rod 23 and the upper die half 19 secured thereto are all returned by the spring 26 to the positions shown in FIG. 1.

In the process of die-stamping a billet of soap or the like having a longitudinal crystalline grain structure, utilising the die set and shell member shown in FIGS. 1 and 2, a soap blank which is preferably milled soap is taken as a piece cut from a continuous extrusion of soap produced by a soap "plodder," the eyeplate orifice through which extrusion takes place being set to produce billets which are not oversize in the transverse direction in relation to the die set which stamps capacity tablets from the billets. This is a matter of experience once the dies have been prepared, and the expert in the art can readily arrive at the required setting of the eyeplate orifice to provide that billets are not oversize in the transverse direction as regards any pair of dies designed for stamping capacity tablets.

However, the billets are oversize in the longitudinal direction only, and it is again a matter of experience once the dies have been prepared, and the expert in the art can readily arrive at the optimum billet length which gives economy as regards off-cut waste and best results for the size and shape of tablet being stamped.

As is well-known in the art, and not illustrated in the drawings, mechanical transfer members such as a pair of opposed gripper fingers engage a billet by its ends, position it between the die pair to overhang at both ends, usually in engagement with the lower die half, and hold the billet rigidly in place until the billet is engaged by the die set, whereupon the transfer members release the billet and retract.

FIGS. 3 and 4 illustrate this position of the operating cycle, and show that the billet 44 is having its oversize end portions 45 trimmed off by interaction of the rim 28 of the tubular shell member 17 and the lip of the lower die half 20. Since both the die halves 19, 20 are a close sliding fit in the shell member 17, the ends of the billet 44 are being trimmed to correspond in contour with the contours of the ends of the die halves. As can be observed from FIG. 4, it is in fact only the two opposite end portions of the shell member which have a trimming action on the billet 44.

Figure 6:
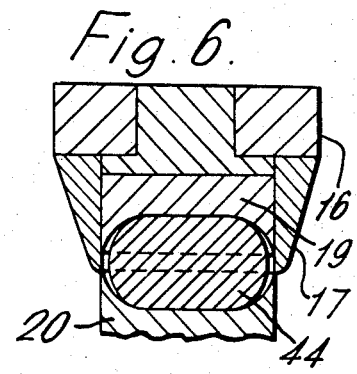
FIG. 6 is a side elevation of FIG. 5 in central transverse cross-section.
Figure 7:
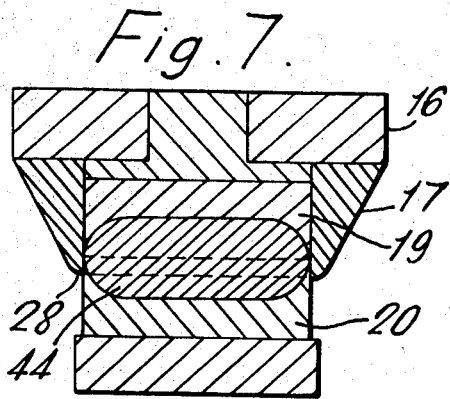
FIG. 7 is a similar diagram to FIG. 5, but shows the die set in a subsequent position in the operating cycle.
Figure 8:
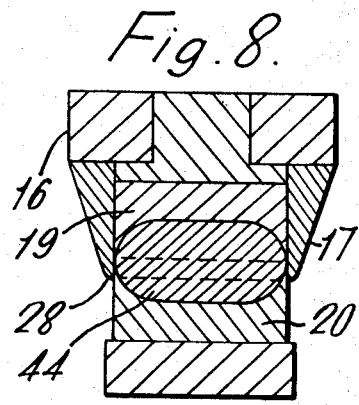
FIG. 8 is a side elevation of FIG. 7 in central transverse cross-section.

FIGS. 5 and 6 illustrate a subsequent position in the operating cycle, in which the rim 28 has descended until it is level with the lip of the lower die half 20, and the oversize end portions 45 of the billet are completely sheared off and fall away for collection as scrap, the main body of the billet 44 now being totally enclosed in a space defined by the upper and lower die halves 19, 20 and the inner wall of the shell member 17 which projects beyond the lip of the upper die half 19. The billet 44 is substantially fully occupying this space in the longitudinal direction of the billet, but as can be observed in FIG. 6 although there has been some deformation shaping of the billet in lateral direction this space is not fully occupied in this direction. FIGS. 7 and 8 illustrate a subsequent position of the operating cycle, in which the upper die half 19 has descended to its final position and the two die halves 19, 20 are substantially closed, their usual setting being to provide for no more than 0.001 inch (0.025 mm.) of separation distance between the opposed continuous lips of the two die halves, the optimum thickness of the lips having been found to be 0.016 inch (0.41 mm.).

From the position in the cycle of operations shown in FIGS. 5 and 6 to the position shown in FIGS. 7 and 8, the lips of the two die halves 19 and 20 are always closely bounded by the inner wall of the shell member 17 projecting beyond the lip of the upper die half 19, the allowance for sliding fit between the lip of the upper die half 19 and the inner wall of the shell member 17 being of the order of 0.001 inch (0.025 mm.). Therefore there is substantially no extrusion of material of the billet 44 outwardly between the lips of the die halves 19, 20 in any direction, so that between these two positions in the cycle of operations the billet 44 is brought to capacity form solely by deformation and shaping.

As has been previously explained, the inner surface of the shell member 17 tapers outwardly very slightly from the lip of the upper die half 19 towards the rim 28 of the shell member 17, so that this final step of bringing the billet 44 to capacity form is accompanied by escape of entrapped air, more particularly from the lateral regions of the die halves and the shell member, although entrapped air can also escape past the ejector 25 in the early stages of stamping.

Figure 9:
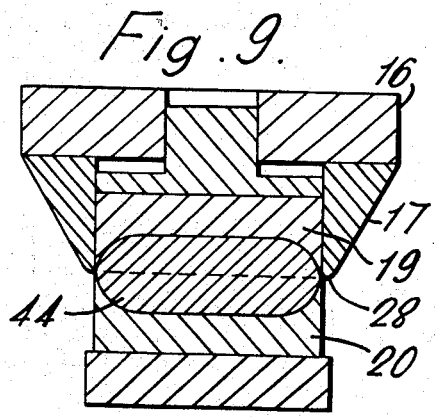
FIG. 9 is a similar diagram to FIG. 7, but shows the die set in a subsequent position in the operating cycle.

Stamping of the capacity tablet is now completed, and the next position of the cycle of operations is illustrated in FIG. 9. The lips of the die halves 19, 20 remain substantially closed, while the shell member 17 moves upwardly with the die slide 11 (FIG. 1), as already explained in detail with reference to FIG. 1. The shell member 17 is shown in FIG. 9 as being raised relative to the upper die half 19 until the rim 28 of the shell member 17 is at the same level as the lip of the upper die half 19 and the billet 44, now a capacity-stamped soap tablet, is readily releasable from the upper die half 19 and the shell member 17. Release of the capacity-stamped tablet occurs when the upper die half 19 is moved upwardly by the spring 26 (FIG. 1), so that the upper die half 19 is lifted away from the billet 44 and is returned to its recessed position within the shell member 17. The conventional spring-loaded ejector 25 (FIGS. 1 and 2) are in the upper die half 19 ensures separation of the stamped billet 44 from the upper half 19 and the shell member 17.

Figure 10:
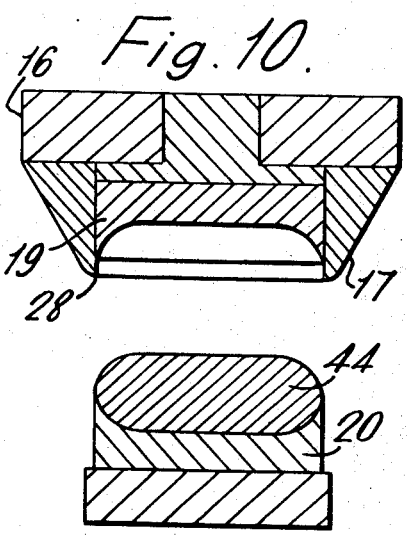
FIG. 10 is a similar diagram to FIG. 9, but shows the die set in the final position in the operating cycle of stamping a capacity soap tablet.

FIG. 10 shows the position in the operating cycle following return of the upper die half 19 to its recessed position within the shell member 17 and positive ejection of the stamped billet 44 from the upper die half 19 by the ejector 25. The upper die half 19 and shell member 17 have been lifted away from the lower die half 20 into their highest positions in the cycle, and the stamped billet 44 remains supported in the lower die half 20. As is well-known in the art, and not illustrated in the drawings, the lower die half 19 is conveniently carried by a rock shaft which tilts through 90° to deposit the stamped billet 44 on a delivery conveyor, and in this connection the stamped billet 44 preferably is positively ejected from the lower die half 20, as by an ejector actuated by a cam when the die half 20 is tilted by the rock shaft.

In the embodiment of the invention which has just been described, since the shell member 17 is relatively-retractable and slidable about the upper die half 19, the quite complicated mechanism described above and shown in FIG. 1 (reference numerals 23 to 43) is included to effect retraction of the shell member 17 before the upper die half 19 is raised.

Figure 11:
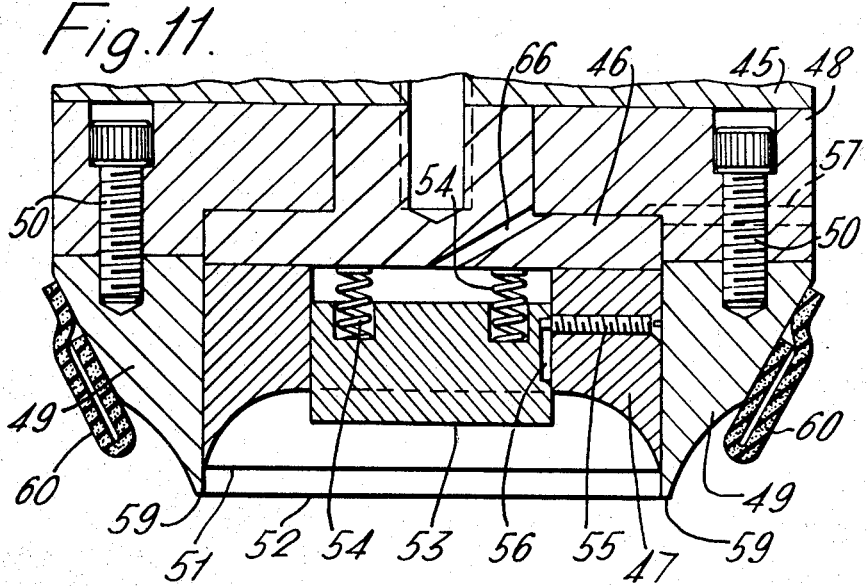
FIG. 11 is a fragmentary central longitudinal cross-sectional view, and shows a die slide and a top die assembly in similar manner to FIG. 1, but relates to a preferred and slightly modified embodiment of the invention.

Referring now to FIG. 11 of the drawings, a transverse mounting plate 45 corresponds with the mounting plate 16 of FIG. 1, and in like manner is rigidly secured to a die slide (not shown) corresponding to the die slide 11 of FIG. 1. Also rigidly secured to the die slide is a die mounting plate 46 which corresponds with the plate 22 of FIG. 1, and an upper die half 47 is rigidly secured to the plate 46. Hence the mounting plates 45 and 46 both move with a die slide to which they are rigidly secured, and neither slides relatively to the other.

Rigidly secured to the mounting plate 45, as by screws (not shown), is the upper portion 48 of a two-part tubular shell member, the lower portion 49 of which is secured to the upper portion 48 as by screws 50. The upper die half 47 is recessed within the lower portion 49 of the tubular shell member, with the lip 51 of the upper die half 47 spaced inwardly from the rim 52 of the shell member a distance not less than 0.1875 inch (4.755 mm.) and not exceeding 0.625 inch (15.875 mm.). 0.1875 inch (4.755 mm.) has been found to be the optimum distance, even for soaps of widely varying compositions and consistencies.

The upper die half is provided with a slidable ejector 53, which is urged outwardly by strong springs 54 and is guided and limited as to its outward movement by a guide and retaining pin 55, the nose of which enters a groove 56 in the ejector. In its fully-outward position, the projection of the ejector from the die exceeds the distance by which the die lip 51 is spaced inwardly from the rim 52 of the shell member.

The inner surface of the lower portion 49 of the shell member is uniformly tapered outwardly to facilitate the escape of entrapped air, in the same way as has already been described with reference to FIG. 1. Additionally an air escape passage 56 is provided in the die mounting plate 46 behind the ejector 53, and a further air escape passage 57 is provided in the upper portion 48 of the tubular shell member.

The lower portion 49 of the tubular shell member can be readily removed to expose the top die half 47, as is needed when adjusting the lip-to-lip clearance between the top die half 48 and a bottom die half 58 (FIG. 12) in preparation for stamping.

The rim 59 of the lower portion 49 of the tubular shell member co-operates with a bottom die half in trimming the ends of a billet which is oversize only in the longitudinal direction exactly as already described with reference to FIGS. 3 to 8 inclusive, but additionally the ends of the shell portion 49 are each provided with a "kicking strip" 60 which prevents oversize end portions trimmed from the billet (see FIGS. 3 and 5) from tending to stick to the shell portion 49. These "kicking strips" 60 conveniently consist of folded strips of foam rubber secured in place by adhesive.

Figure 12:
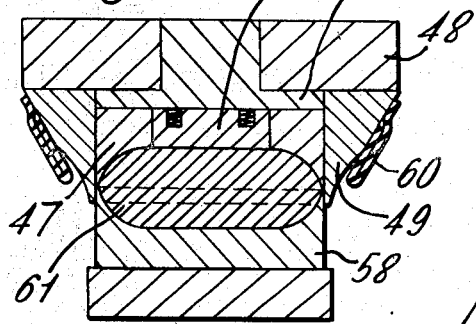
FIG. 12 is a diagram similar to FIG. 7 showing a die set of the preferred modified embodiment in a position in its operating cycle.

The manner of operation of the modified top die and tubular shell of FIG. 11, in co-operating with a bottom die 58 as shown in FIG. 12, is exactly the same as previously described with reference to FIGS. 3 to 8 inclusive, at which point in a stamping cycle the position illustrated in FIG. 12 is reached. The main body of a billet 61 is totally enclosed in a space defined by the upper and lower die halves 47, 58, since the upper die half has descended to its final position and the two die halves are substantially closed, the lips of the two die halves being closely bounded by the inner wall of the shell portion 49. The billet 44 is brought to capacity form solely by deformation and shaping and there is no extrusion of material outwardly from between the lips of the die halves 47, 58 in any direction. The ejector 53 has been pushed fully into the top die half 53, compressing its springs 54.

Figure 13:
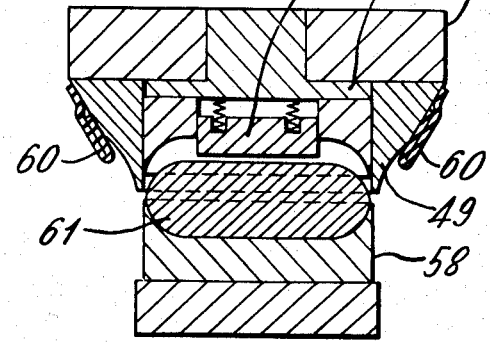
FIG. 13 is a similar diagram to FIG. 12 but shows the modified die set in a subsequent position in the operating cycle.

Stamping of the capacity tablet is now completed, and the next position in the cycle of operations is shown in FIG. 13. The whole assembly of the top die half 47 and the two-portion shell member 48, 49 moves bodily upwardly with the die slide, away from the bottom die half 58. The ejector 53 projects from the top die half 47 under the action of its strong springs, to detach the stamped tablet from the top die half 47 and the shell portion 49 and leave it resting on the bottom die half 58. The manner of removal of the stamped tablet from the bottom die half has already been described with reference to FIG. 10.

As regards both embodiments which have been described, when the lips of the dies are meeting they are in a common flat plane, to stamp a tablet which is symmetrical on both sides of a central flat plane, and the rim of the tubular shell member similarly lies in a single flat plane. The dies could however, meet for their lips to define a curved plane, to stamp a tablet which is curved in side elevation, and in such cases the contour of the rim of the shell member should follow the contours of the lips of the dies.

Since there is not extruded scrap material for removal and disposal, the present invention obviates the hitherto serious problems of cleaning and collection of scrap. In the absence of any extrusion of material from between the dies there is a minimum of disturbance of the original longitudinal crystalline grain structure of the extruded billets, and in particular the absence of horizontal stratification in the capacity-stamped tablets in their horizontal medial planes is most marked.

It will be appreciated that the principle underlying the present invention is the selection of the optimum cross-sectional area of the billet in relation to the die pair, in conjunction with the trimming and pre-shaping of the ends of the billet by the rim of the shell member and the lower die half, to result in a trimmed billet of theoretically the exact volume of the space encompassed by the closed die halves, which therefore shape and deform the trimmed billet to capacity shape with substantially no extrusion of the material of the billet from between the die halves. The tubular shell member, in addition to the trimming action of its end portions upon the ends of the oversize billet which overhang the ends of the die halves, also functions positively to prohibit the extrusion of the material of the billet from between the die halves following the rim of the shell member reaching and moving beyond the plane of the lip of the lower die half.

The oversize material trimmed from the ends of the billet as waste can be relatively small, for example it has been found in practice that the trimmed-off waste for a final tablet weight of 100 grams can be as low as 8 grams.

Since the tablets are moulded with substantially no extrusion the edge lines of the tablets are neat, and moreover there is no variation in weight consistency of the tablets if the plasticity of the soap should vary. Furthermore, the tablet weight can be adjusted, if a variation in thickness of the edge line of the tablets is acceptable for weight increase, by a simple adjustment of the clearance between the close die halves and a corresponding variation in the cross-sectional area of the billets.

However, a marked advantage which the invention secures over stamping with extrusion is the minimum disturbance of the soap grain structure both longitudinally and transversely with tablets stamped according to the invention, which therefore do not tend to split during use. Whereas a tablet produced by extrusion stamping shows, in transverse cross-section, a grain structure which flows outwardly horizontally at the line edges of the tablet, a tablet produced according to the invention has a grain structure which shows in transverse cross-section as a series of flattened concentric rings.

What is claimed is:

1. In the process of die-stamping billets of soap and like material having a longitudinal crystalline grain structure into capacity tablets, the steps which comprise placing a billet which is oversize only in its longitudinal direction between mating die halves to overhang at both ends of said mating die halves, trimming the ends of said billet to correspond in contour with the contours of the ends of said die halves, and bringing said die halves into substantially mating contact to deform and shape the trimmed billet with substantially no extrusion of material from between the die halves to form a capacity tablet.

2. In the process of stamping billets of soap and like material having a longitudinal grain structure into capacity tablets by means of upper and lower movable mating die halves, the steps which comprise providing the upper die half with a close-fitting tubular shell at least the end portions of which project in advance of said die half, placing a billet which is oversize only in its longitudinal direction between the mating die halves to overhang at both ends thereof, trimming off the ends of the billet to correspond in contour with the ends of said die halves by interaction of the rim of the shell and the lower die half, and bringing said die halves into substantially mating contact to deform and shape the remainder of the billet with substantially no extrusion of material from between the die halves to form a capacity tablet.

References Cited

UNITED STATES PATENTS

| 305,293 | 9/1884 | Collier | 25—7 X |
| 461,973 | 10/1891 | Brown | 264—163 |
| 3,097,057 | 7/1963 | Takeuchi | 25—7 X |
| 3,159,699 | 12/1964 | Sutphin | 264—320 |
| 3,357,072 | 12/1967 | Sutphin | 25—7 |
| 3,365,764 | 1/1968 | Wall | 25—7 |

ROBERT F. WHITE, Primary Examiner

A. M. SOKAL, Assistant Examiner

U.S. Cl. X.R.

264—163